United States Patent
Delker et al.

(10) Patent No.: US 10,664,811 B2
(45) Date of Patent: May 26, 2020

(54) AUTOMATED CHECK ENCODING ERROR RESOLUTION

(71) Applicant: Bank of America Corporation, Charlotte, NC (US)

(72) Inventors: Andrew Delker, Waltham, MA (US); Darlene D. Meunier, New Douglas, IL (US); John Barrett Hall, Charlotte, NC (US); Linda D. Suarez, Mesquite, TX (US); James N. Reid, Schuyler, NY (US); Debra R. Murphy, Malden, MA (US); Linda B. Nipper, Concord, NC (US)

(73) Assignee: Bank of America Corporation, Charlotte, NC (US)

( * ) Notice: Subject to any disclaimer, the term of this patent is extended or adjusted under 35 U.S.C. 154(b) by 283 days.

(21) Appl. No.: 15/928,320

(22) Filed: Mar. 22, 2018

(65) Prior Publication Data
US 2019/0295048 A1 Sep. 26, 2019

(51) Int. Cl.
*G06Q 20/04* (2012.01)
*G06K 9/58* (2006.01)
*G06K 9/00* (2006.01)

(52) U.S. Cl.
CPC ....... *G06Q 20/042* (2013.01); *G06K 9/00442* (2013.01); *G06K 9/58* (2013.01); *G06K 2209/01* (2013.01)

(58) Field of Classification Search
CPC ....... G06Q 20/042; G06K 9/0442; G06K 9/58
See application file for complete search history.

(56) References Cited

U.S. PATENT DOCUMENTS 7,283,656 B2   10/2007   Blake et al.
8,167,196 B2   5/2012    Mueller et al.
(Continued)

FOREIGN PATENT DOCUMENTS

WO   WO-2009045998 A1 *   4/2009   ............. G06Q 20/04
WO   WO-2011058554 A1 *   5/2011   ............. G06Q 20/401

OTHER PUBLICATIONS

Sarangsoft: Why use Optical Character Recognition in Various Scenarios, Mar. 2, 2017, Office Management, pp. 1-4. (Year: 2017).*
(Continued)

*Primary Examiner* — Bijendra K Shrestha
(74) *Attorney, Agent, or Firm* — Banner & Witcoff, Ltd.

(57) ABSTRACT

Aspects of the disclosure relate to enhanced check processing systems with improved check validation features and enhanced information security. A computing platform may determine whether a correlation between source data and metadata associated with a check exceeds a predetermined correlation threshold. Based on determining that the correlation does not exceed the predetermined correlation threshold, the computing platform may direct an OCR computing system to perform character recognition on the check. Then, the computing platform may determine whether a discrepancy between the metadata and an OCR output from the OCR computing system exceeds a predetermined resolution threshold. In response to determining that the discrepancy between the OCR output and the metadata does not exceed the predetermined resolution threshold, the computing platform may update stored records associated with the check. Subsequently, the computing platform may direct a DDA computing system to post a corrected payment associated with the check.

20 Claims, 13 Drawing Sheets

(56) References Cited

U.S. PATENT DOCUMENTS

| | | |
|---|---|---|
| 8,387,862 B2 | 3/2013 | Mueller |
| 2004/0247168 A1 | 12/2004 | Pintsov et al. |
| 2005/0139671 A1 | 6/2005 | McGlamery et al. |
| 2014/0019346 A1 | 1/2014 | Eliscu |
| 2017/0177570 A1 | 6/2017 | Dorn |
| 2017/0178034 A1 | 6/2017 | Skeen et al. |
| 2017/0200162 A1 | 7/2017 | Pourfallah et al. |
| 2017/0214700 A1 | 7/2017 | Bacastow et al. |
| 2017/0220886 A1 | 8/2017 | Canero Morales et al. |
| 2017/0244561 A1 | 8/2017 | Suominen |
| 2017/0249452 A1 | 8/2017 | King |
| 2017/0255793 A1 | 9/2017 | Caldwell |
| 2017/0255962 A1 | 9/2017 | Lim et al. |
| 2017/0262864 A1 | 9/2017 | Sager et al. |
| 2017/0269890 A1 | 9/2017 | Alacar |
| 2017/0270508 A1 | 9/2017 | Roach et al. |
| 2017/0286961 A1 | 10/2017 | Robeen |
| 2017/0302450 A1 | 10/2017 | Ebrahimi |
| 2017/0323157 A1 | 11/2017 | Guzman et al. |
| 2017/0323524 A1 | 11/2017 | Washington et al. |
| 2017/0324750 A1 | 11/2017 | Khan |
| 2017/0329996 A1 | 11/2017 | Wilson |
| 2017/0337542 A1 | 11/2017 | Kim et al. |
| 2017/0345018 A9 | 11/2017 | Sager et al. |
| 2017/0364893 A1 | 12/2017 | Kurian |
| 2018/0025334 A1 | 1/2018 | Pourfallah et al. |
| 2018/0025566 A1 | 1/2018 | Keller |
| 2018/0032535 A1 | 2/2018 | Johnson |
| 2018/0048474 A1 | 2/2018 | Landrock et al. |
| 2018/0048567 A1 | 2/2018 | Ignatchenko |
| 2018/0060928 A1 | 3/2018 | Sadler et al. |
| 2018/0060983 A1 | 3/2018 | Elias et al. |
| 2018/0068274 A1 | 3/2018 | Buffington |
| 2018/0068319 A1 | 3/2018 | Ramavarjula et al. |

OTHER PUBLICATIONS

Jayadevan, R.: Automated processing of handwritten bank cheque images: A survey, Dec. 2011, Document Analysis and Recognition, pp. 1-31 (Year: 2011).*

* cited by examiner

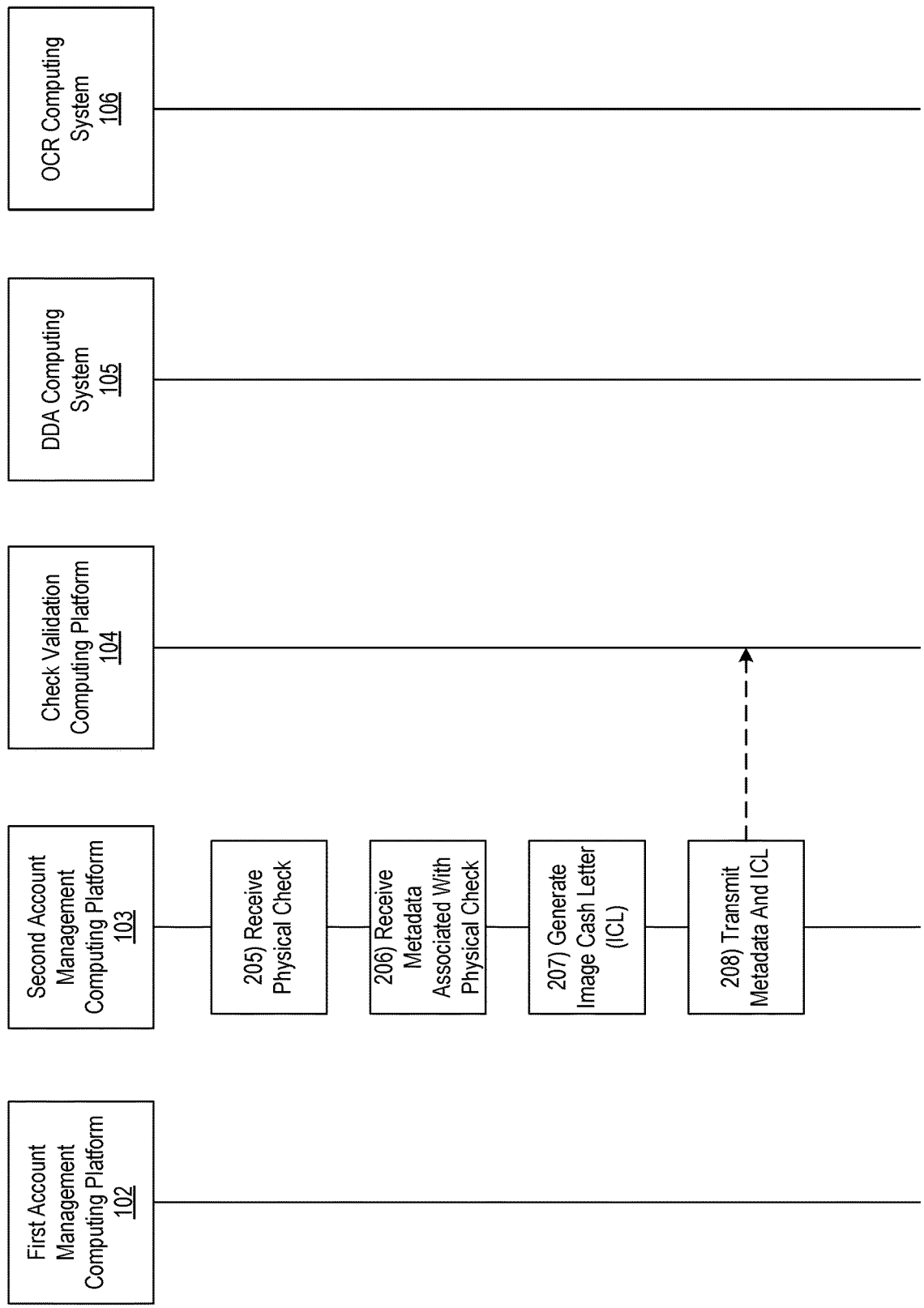

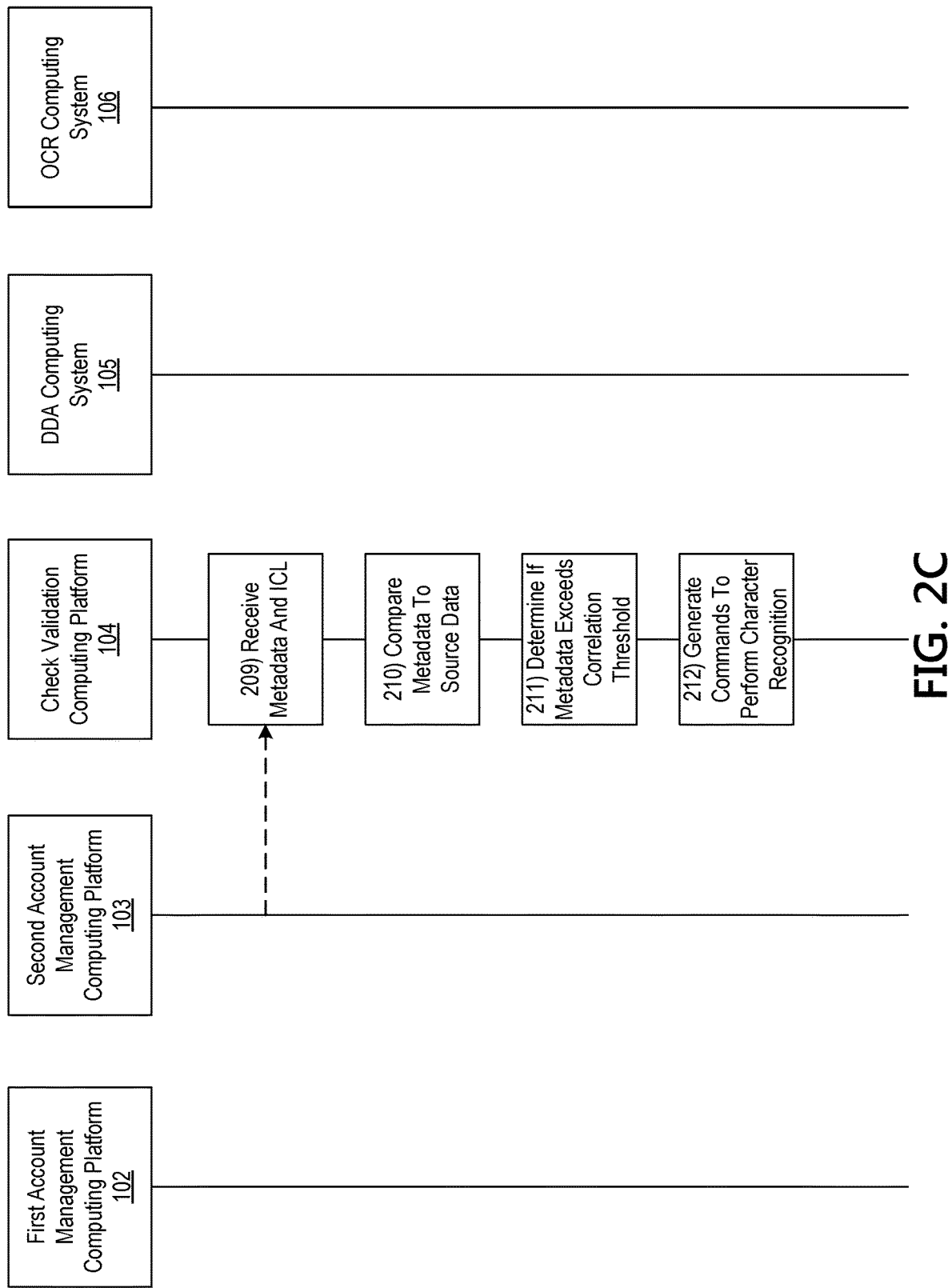

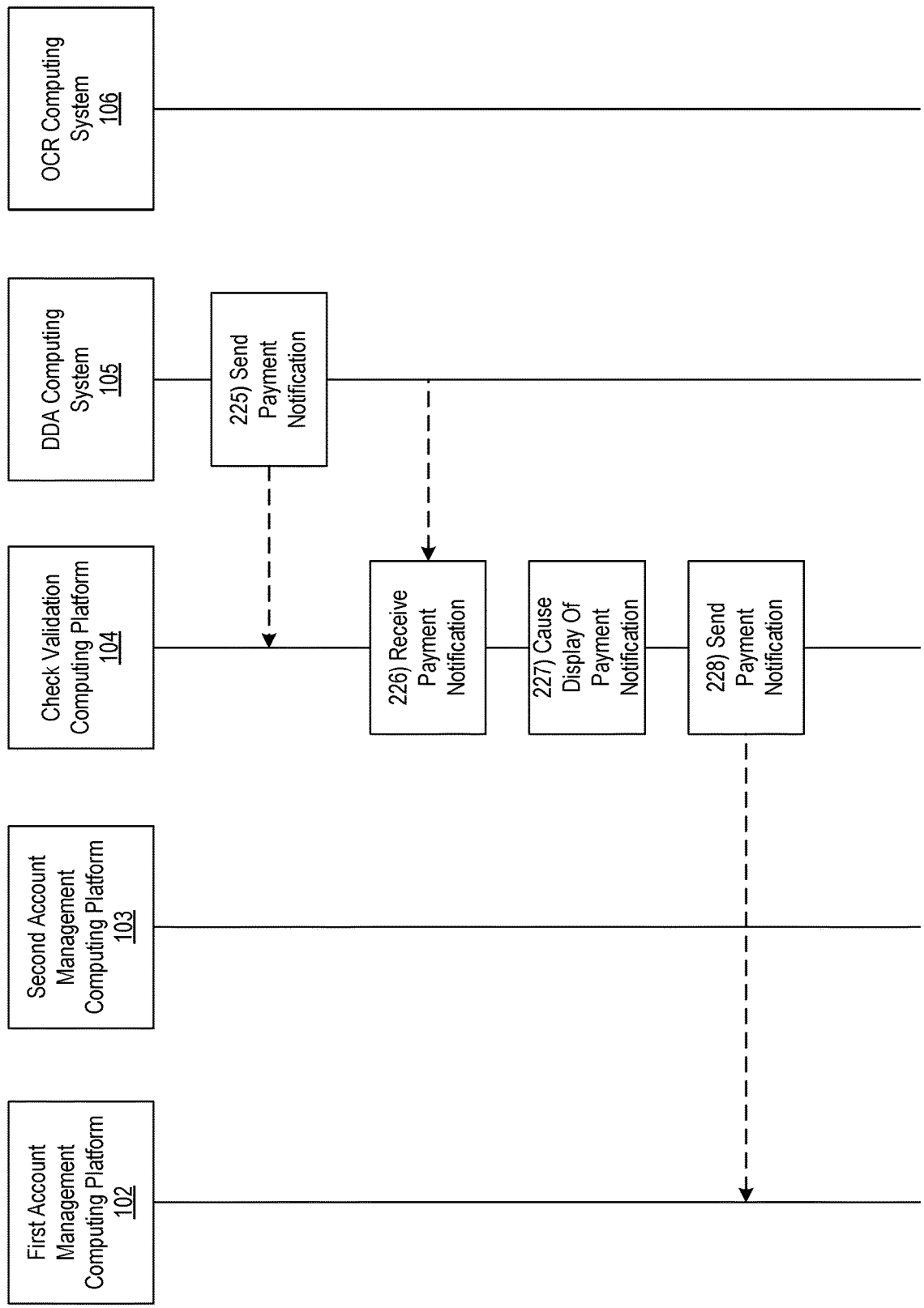

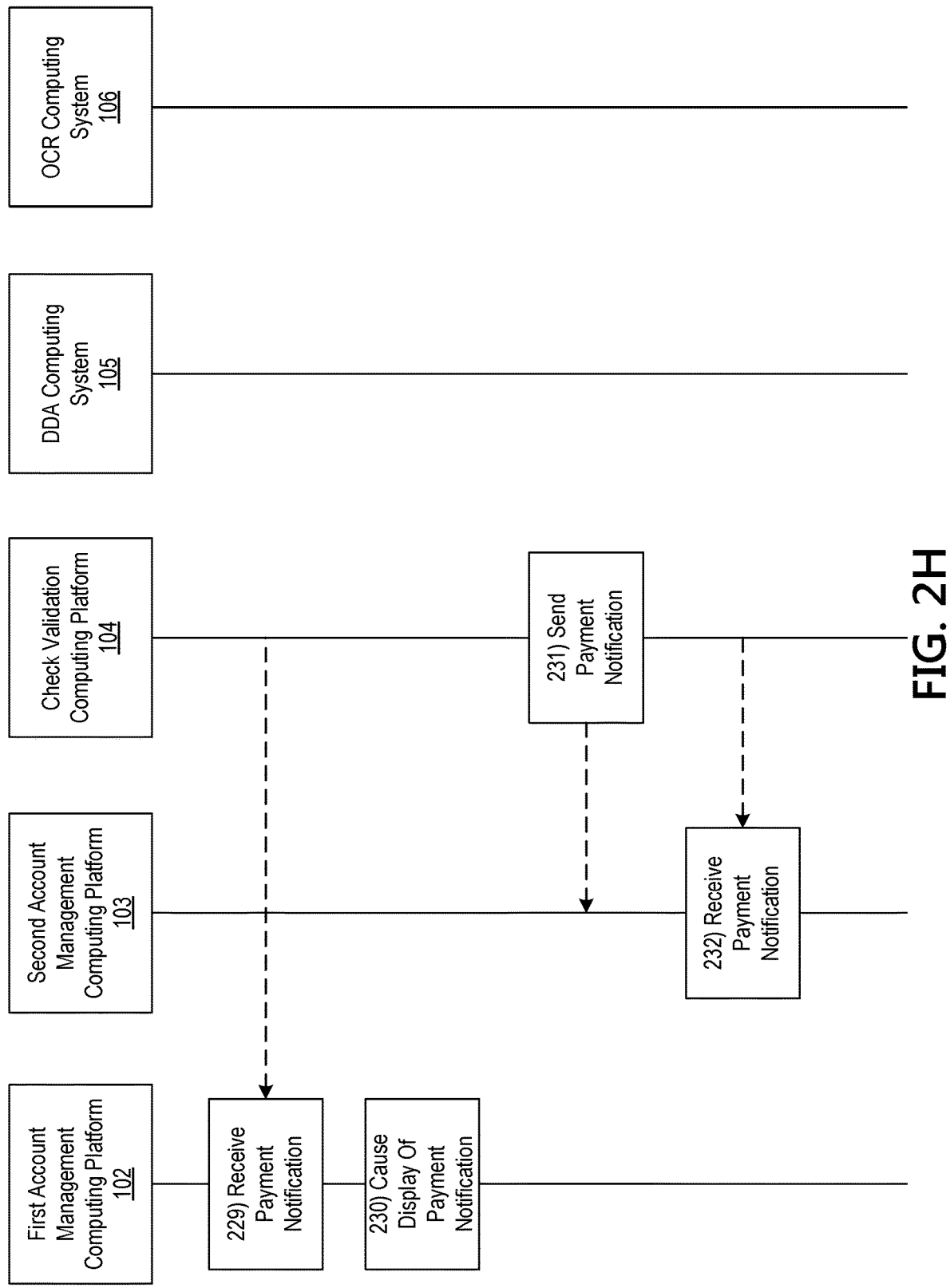

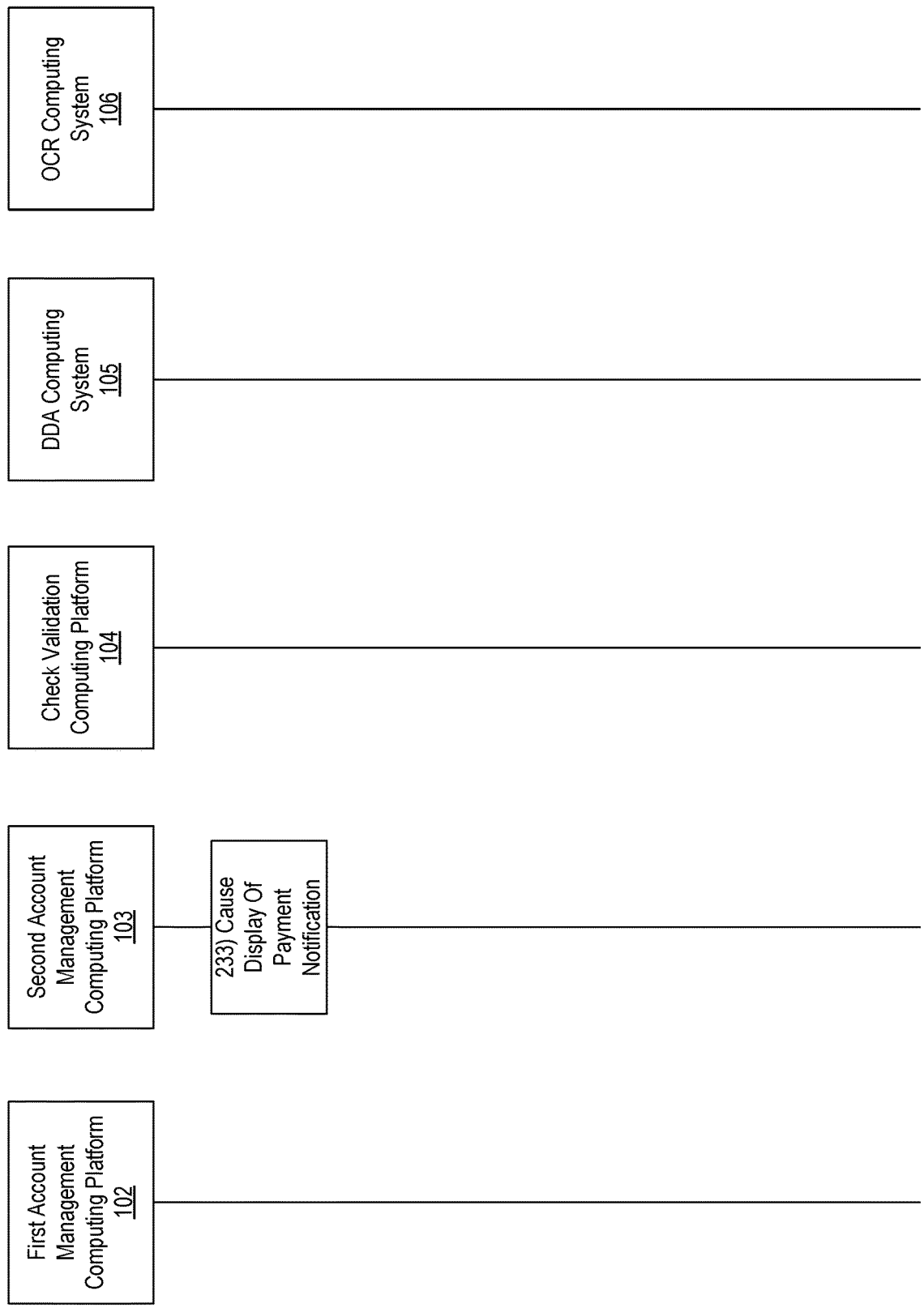

305

Operator Correction Interface

OCR Unable to Automate Correction

Please Initiate Manual Review

Account Management Interface

| Previously Determined Payment | Revised Payment |
|---|---|
| Account #: | Account #: |
| Check #: | Check #: |
| Amount $: | Amount $: |

FIG. 4

AUTOMATED CHECK ENCODING ERROR RESOLUTION

BACKGROUND

Aspects of the disclosure relate to enhanced check processing systems with improved check validation features and enhanced information security. In particular, one or more aspects of the disclosure relate to check processing systems that utilize metadata and source data associated with checks to perform check validation, improve payment accuracy, and facilitate secure transactions.

Because many organizations and individuals rely on checks as a method for exchanging funds, ensuring the security and integrity of the computer systems used in processing check transactions is important. In many instances, however, it may be difficult to optimize the technical performance and operating efficiency of these computer systems while also ensuring that the security and integrity of these computer systems is maintained.

SUMMARY

Aspects of the disclosure provide effective, efficient, scalable, and convenient technical solutions that address and overcome the technical problems associated with optimizing the performance of and ensuring the security of check processing computer systems, along with the information that such systems may maintain, using enhanced validation techniques.

In accordance with one or more embodiments, a computing platform having at least one processor, a communication interface, and memory may receive, via the communication interface and from one or more computing platforms, source data associated with a check. The computing platform may also receive, from a first account management computing platform and via the communication interface, a metadata output associated with the check. Then, the computing platform may determine whether a correlation between the source data and the metadata output exceeds a predetermined correlation threshold. Based on determining that the correlation does not exceed the predetermined correlation threshold, the computing platform may generate one or more commands directing an optical character recognition (OCR) computing system to perform character recognition on the check. Then, the computing platform may transmit, to the OCR system and via the communication interface, the one or more commands directing the OCR system to perform character recognition on the check. Subsequently, the computing platform may receive, from the OCR system and via the communication interface, an OCR output. Then, the computing platform may determine whether a discrepancy between the OCR output and the metadata output exceeds a predetermined resolution threshold. In response to determining that the discrepancy between the OCR output and the metadata output does not exceed the predetermined resolution threshold, the computing platform may update stored records associated with the check. After updating the stored records associated with the check, the computing platform may generate one or more commands directing a demand deposit account (DDA) computing system to post, based on a correction of the discrepancy between the OCR output and the metadata output, a corrected payment associated with the check. Subsequently, the computing platform may transmit, to the DDA system and via the communication interface, the one or more commands directing the DDA system to post the corrected payment associated with the check In some embodiments, the computing platform may receive, from the DDA system and via the communication interface, a payment notification indicating that a payment associated with the check has been posted.

In some embodiments, the computing platform may transmit, to the first account management computing platform and via the communication interface, the payment notification. In addition, the computing platform may transmit, to a second account management computing platform and via the communication interface, the payment notification.

In some embodiments, the one or more computing platforms may comprise at least one of the first account management computing platform and the second account management computing platform.

In some embodiments, the source data may comprise one or more of an issue file output from the second account management computing platform, an image cash letter (ICL) output, or a magnetic ink character recognition (MICR) output.

In some embodiments, the computing platform may receive, from one or more computing systems, second source data associated with a second check. Then, the computing platform may receive, from the first account management computing platform and via the communication interface, a second metadata output associated with the second check. Subsequently, the computing platform may determine whether a correlation between the second source data and the second metadata output exceeds the predetermined correlation threshold. Based on determining that the correlation exceeds the predetermined correlation threshold, the computing platform may generate one or more commands directing the DDA computing system to post a payment associated with the second check. Subsequently, the computing platform may transmit, to the DDA system and via the communication interface, the one or more commands directing the DDA system to post the payment associated with the second check.

In some embodiments, posting the corrected payment associated with the check may include causing deposit, by the computing platform, of an amount associated with the check.

In some embodiments, the OCR output may comprise one or more of an amount of money, an account number, a check serial number, a plot location of particular data, a pixel count, and or payee name.

In some embodiments, the computing platform may receive, from one or more computing systems, second source data associated with a second check. The computing platform may also receive, from the first account management computing platform and via the communication interface, a second metadata output associated with the second check. Then, the computing platform may determine whether a correlation between the second source data and the second metadata output exceeds the predetermined correlation threshold. Based on determining that the correlation does not exceed the predetermined correlation threshold, the computing platform may generate one or more commands directing an optical character recognition (OCR) computing system to perform character recognition on the second check. Subsequently, the computing platform may transmit, to the OCR system and via the communication interface, the one or more commands directing the OCR system to perform character recognition on the second check. Then, the computing platform may receive, from the OCR system and via the communication interface, a second OCR output.

In some embodiments, the computing platform may determine whether a discrepancy between the second OCR output and the second metadata output exceeds the predetermined resolution threshold. Based on determining that the discrepancy between the second OCR output and the second metadata output exceeds the predetermined resolution threshold, the computing platform may generate a manual payment correction notification. In addition, the computing platform may generate one or more commands directing an operator correction computing device to cause display of the manual payment correction notification. Then, the computing platform may receive, from the operator correction computing device, a manual payment correction confirmation. Subsequently, the computing platform may update, in response to receiving the manual payment correction confirmation, stored records associated with the second check. After updating the stored records associated with the check, the computing platform may generate one or more commands directing the DDA system to post, based on a correction of the discrepancy between the second OCR output and the second metadata output, a corrected payment associated with the second check. Thereafter, the computing platform may transmit, to the DDA system and via the communication interface, the one or more commands directing the DDA system to post the corrected payment associated with the second check.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for deploying an enhanced check processing system that utilizes improved validation techniques in accordance with one or more example embodiments;

FIGS. 3 and 4 depict example graphical user interfaces for deploying an enhanced check processing system that utilizes improved validation techniques in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
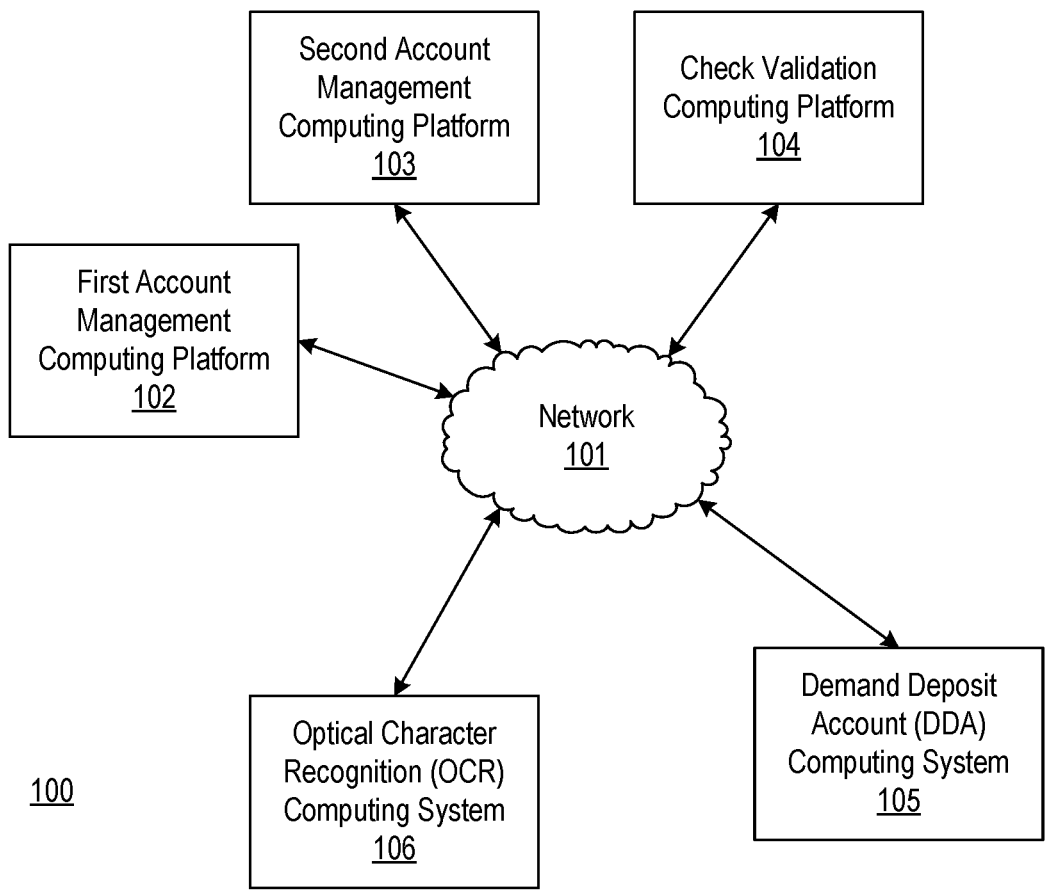
FIGS. 1A and 1B depict an illustrative computing environment for deploying an enhanced check processing system that utilizes improved validation techniques in accordance with one or more example embodiments.
Figure 1B:
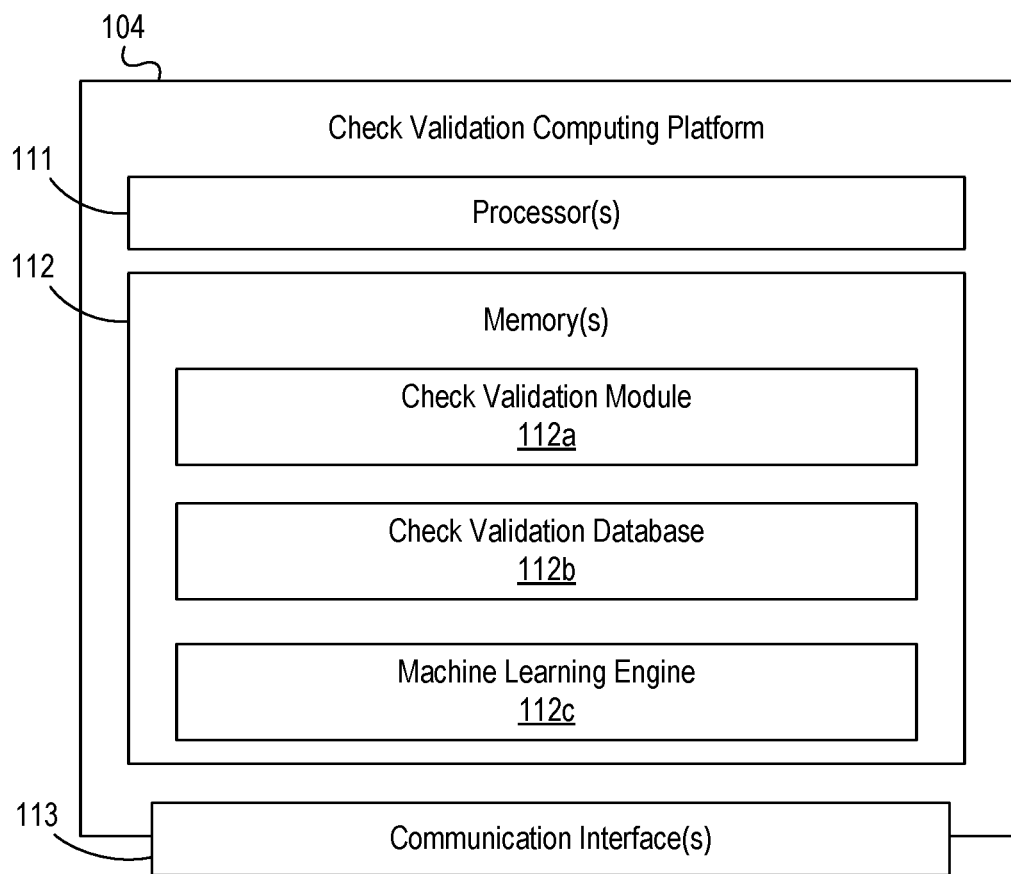

FIGS. 1A and 1B depict an illustrative computing environment for deploying an enhanced check processing system that utilizes improved validation techniques in accordance with one or more example embodiments. Referring to FIG. 1A, computing environment 100 may include one or more computer systems. For example, computing environment 100 may include a first account management computing platform 102, a second account management computing platform 103, a check validation computing platform 104, a demand deposit account (DDA) computing system 105, and an optical character recognition (OCR) computing system 106.

First account management computing platform 102 may include one or more computing devices and/or other computer components (e.g., processors, memories, communication interfaces). In addition, and as illustrated in greater detail below, first account management computing platform 102 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by first account management computing platform 102 may be associated with an internal portal provided by an organization, such as a check processing management portal provided by a financial institution. Such a portal may, for instance, provide employees of the financial institution with access to financial account information (e.g., account balance information, account statements, recent transaction history information, or the like) and/or may provide employees of the financial institution with menus, controls, and/or other options to schedule and/or execute various transactions (e.g., issuing checks, withdrawals, deposits, or the like).

Second account management computing platform 103 may include one or more computing devices and/or other computer components (e.g., processors, memories, communication interfaces). In addition, and as illustrated in greater detail below, second account management computing platform 103 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by second account management computing platform 103 may be associated with an internal portal provided by an organization, such as a check processing management portal provided by a financial institution. Such a portal may, for instance, provide employees of the financial institution with access to financial account information (e.g., account balance information, account statements, recent transaction history information, or the like) and/or may provide employees of the financial institution with menus, controls, and/or other options to schedule and/or execute various transactions (e.g., issuing checks, withdrawals, deposits, or the like). In one or more arrangements, second account management computing platform 103 may be operated by, used by, and/or otherwise associated with a second financial institution different from a first financial institution that may operate, use, and/or otherwise be associated with first account management computing platform 102.

As illustrated in greater detail below, check validation computing platform 104 may include one or more computing devices configured to perform one or more of the functions described herein. For example, check validation computing platform 104 may include one or more computers (e.g., laptop computers, desktop computers, servers, server blades, or the like).

DDA computing system 105 may be a computer system that includes one or more computing devices and/or other computer components (e.g., processors, memories, communication interfaces). In addition, DDA computing system 105 may be configured to receive requests (e.g., requests to process payments issued and/or received by the first account management computing platform 102 and the second account management computing platform 103) from one or more remote computing devices and/or perform various functions with respect to such requests, as discussed in greater detail below.

OCR computing system 106 may be a computer system that includes one or more computing devices and/or other computer components (e.g., processors, memories, communication interfaces). In addition, OCR computing system 106 may be configured to receive requests (e.g., requests to perform optical character recognition on a check from an account management computing platform, such as first account management computing platform 102, second account management computing platform 103, and the like). In some instances, the OCR computing system 106 may determine source data from a face of a check. The OCR computing system 106 may transmit the source data to the check validation computing platform 104 for further analysis, as discussed in greater detail below.

Computing environment 100 also may include one or more networks, which may interconnect one or more of first account management computing platform 102, second account management computing platform 103, check validation computing platform 104, DDA computing system 105, and OCR computing system 106. For example, computing environment 100 may include a network 101 (which may, e.g., interconnect first account management computing platform 102, second account management computing platform 103, check validation computing platform 104, DDA computing system 105, and OCR computing system 106).

In one or more arrangements, first account management computing platform 102, second account management computing platform 103, check validation computing platform 104, DDA computing system 105, OCR computing system 106, and/or the other systems included in computing environment 100 may be any type of computing device capable of receiving a user interface, receiving input via the user interface, and communicating the received input to one or more other computing devices. For example, first account management computing platform 102, second account management computing platform 103, check validation computing platform 104, DDA computing system 105, OCR computing system 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of first account management computing platform 102, second account management computing platform 103, check validation computing platform 104, DDA computing system 105, OCR computing system 106 may, in some instances, be special-purpose computing devices configured to perform specific functions.

Referring to FIG. 1B, check validation computing platform 104 may include one or more processors 111, memory 112, and communication interface 113. A data bus may interconnect processor 111, memory 112, and communication interface 113. Communication interface 113 may be a network interface configured to support communication between check validation computing platform 104 and one or more networks (e.g., network 101, or the like). Memory 112 may include one or more program modules having instructions that when executed by processor 111 cause check validation computing platform 104 to perform one or more functions described herein and/or one or more databases that may store and/or otherwise maintain information which may be used by such program modules and/or processor 111. In some instances, the one or more program modules and/or databases may be stored by and/or maintained in different memory units of check validation computing platform 104 and/or by different computing devices that may form and/or otherwise make up check validation computing platform 104. For example, memory 112 may have, store, and/or include a check validation module 112a, a check validation database 112b, and a machine learning engine 112c. Check validation module 112a may have instructions that direct and/or cause check validation computing platform 104 to execute advanced check validation techniques, as discussed in greater detail below. Check validation database 112b may store information used by check validation module 112a and/or check validation computing platform 104 in check validation and/or in performing other functions. Machine learning engine 112c may have instructions that direct and/or cause the check validation computing platform 104 to perform check validation and to set, define, and/or iteratively refine optimization rules and/or other parameters used by the check validation computing platform 104 and/or other systems in computing environment 100.

Figure 2A:
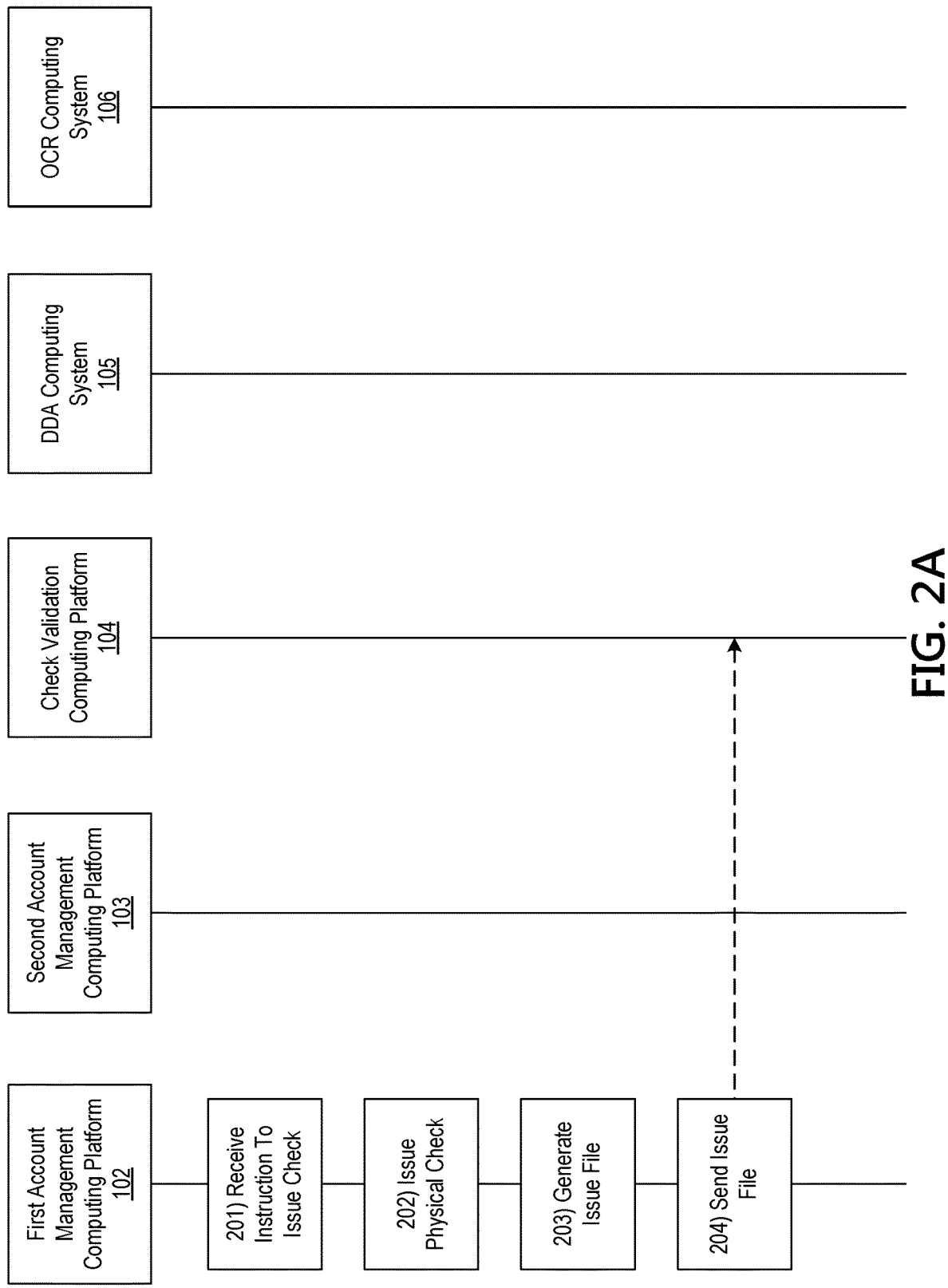

FIGS. 2A-2I depict an illustrative event sequence for deploying an enhanced check processing system that utilizes improved validation techniques in accordance with one or more example embodiments. Referring to FIG. 2A, at step 201, first account management computing platform 102 may receive an instruction to issue a check. For example, first account management computing platform 102 may receive an instruction to issue a personal check, a business check, a reimbursement check, a corporate-issued paycheck, or the like from a user of first account management computing platform 102 (who may, e.g., be an employee or affiliate of an organization operating and/or otherwise using first account management computing platform 102).

At step 202, first account management computing platform 102 may issue the check. For example, the first account management computing platform 102 may cause a check to be printed. In printing and/or otherwise issuing the check, first account management computing platform 102 may cause the check to indicate an amount of money to be transferred and an account into which the money should be transferred.

At step 203, first account management computing platform 102 may generate an issue file. For example, the first account management computing platform 102 may generate an issue file that includes information indicating the amount of money to be transferred, the account into which the money should be transferred, a check number, and/or other information associated with the check.

At step 204, the first account management computing platform 102 may transmit, to check validation computing platform 104, the issue file generated at step 203. For example, the first account management computing platform 102 may establish a connection to check validation computing platform 104. For example, the first account management computing platform 102 may establish a first wireless data connection to check validation computing platform 104 to link the first account management computing platform 102 to the check validation computing platform 104. While the first wireless data connection is established, the first account management computing platform 102 may transmit, to check validation computing platform 104 and via the communication interface 113, the issue file.

Referring to FIG. 2B, at step 205, second account management computing platform 103 may receive the check issued at step 201. In some examples, the first account management computing platform 102 may be associated with the same financial institution as second account management computing platform 103. For example, the first account management computing platform 102 may receive an instruction to issue a check for an account from a first financial institution and then the second account management computing platform 103 may subsequently receive an instruction to cause an amount indicated by the check to be deposited into a different account associated with the first financial institution. In other examples, the first account management computing platform 102 may be associated with a different financial institution than the second account management computing platform 103. For example, a the first account management computing platform 102 may receive an instruction to issue a check for an account from the first financial institution and then the second account management computing platform 103 may subsequently receive an instruction to cause an amount indicated by the check to be deposited into a different account associated with a second financial institution. The second account management computing platform 103 may instructions to process a physical check (such as an actual paper check) or a virtual check (electronic fund transfer, an image of a check captured via a mobile banking application, or the like).

At step 206, the second account management computing platform 103 may receive metadata associated with the check. In some instances, the second account management computing platform 103 may receive instructions to electronically scan the check to generate the metadata. In other instances, source data from the check may be entered via a user interface generated, displayed, and/or otherwise provided by the second account management computing platform 103. For example, the second account management computing platform 103 may generate a user interface prompting a user (who may e.g., be an employee or affiliate of an organization operating and/or otherwise using the second account management computing platform 103) to enter an account number, an amount, a check number, and the like associated with the check.

At step 207, the second account management computing platform 103 may generate an image cash letter (ICL). For example, the second account management computing platform 103 may generate the ICL using one of the remotely created checks (RCC) and X9.37 standards. For example, the second management computing platform 103 may generate a digital reproduction of the check including information such as account number, amount, and check number associated with the check received at step 205.

At step 208, the second account management computing platform 103 may transmit the metadata and the ICL to the check validation computing platform 104. For example, the second account management computing platform 103 may establish a connection to check validation computing platform 104. For example, the second account management computing platform 103 may establish a second wireless data connection to check validation computing platform 104 to link the second account management computing platform 103 to the check validation computing platform 104. While the second wireless data connection is established, the second account management computing platform 103 may transmit, via the communication interface 113 and to check validation computing platform 104, the metadata and the ICL.

Referring to FIG. 2C, at step 209, the check validation computing platform 104 may receive the metadata and the ICL. For example, the check validation computing platform 104 may receive, from the second account management computing platform 103, via the communication interface 113, and via the second wireless data connection, the metadata and the ICL. In some instances, the check validation computing platform 104 may receive the metadata and the ICL prior to receiving the issue file. In other instances, the check validation computing platform 104 may receive the issue file prior to receiving the metadata and the ICL.

At step 210, check validation computing platform 104 may compare the metadata, received at step 209, to source data. For example, the check validation computing platform 104 may compare the metadata to one or more of the issue file, the ICL, magnetic ink character recognition code (MICR) data from the face of the check, and the like.

At step 211, the check validation computing platform 104 may determine, based on the comparison performed at step 210, if the metadata exceeds a predetermined correlation threshold. For example, if the metadata exceeds the predetermined correlation threshold, the check validation computing platform 104 may determine that the metadata matches the source data, and that the payment should be posted. If the metadata does exceed the predetermined correlation threshold, the check validation computing platform 104 may proceed to step 220 to post a payment associated with the check. In another example, if the metadata does not exceed the predetermined correlation threshold, the check validation computing platform 104 may determine that there is a discrepancy between the metadata and the source data, and that the payment should be further analyzed prior to posting. If the metadata does not exceed the predetermined correlation threshold, the check validation computing platform 104 may proceed to step 212. The check validation computing platform 104 may determine if the metadata exceeds the predetermined correlation threshold using, for example, machine learning analysis, algorithms, and datasets.

At step 212, check validation computing platform 104 may generate one or more optical character recognition (OCR) commands. For example, at step 212, based on determining that the metadata does not exceed the predetermined correlation threshold, check validation computing platform 104 may generate one or more OCR commands directing OCR computing system (e.g., OCR computing system 106) to perform optical character recognition on the check.

Figure 2D:
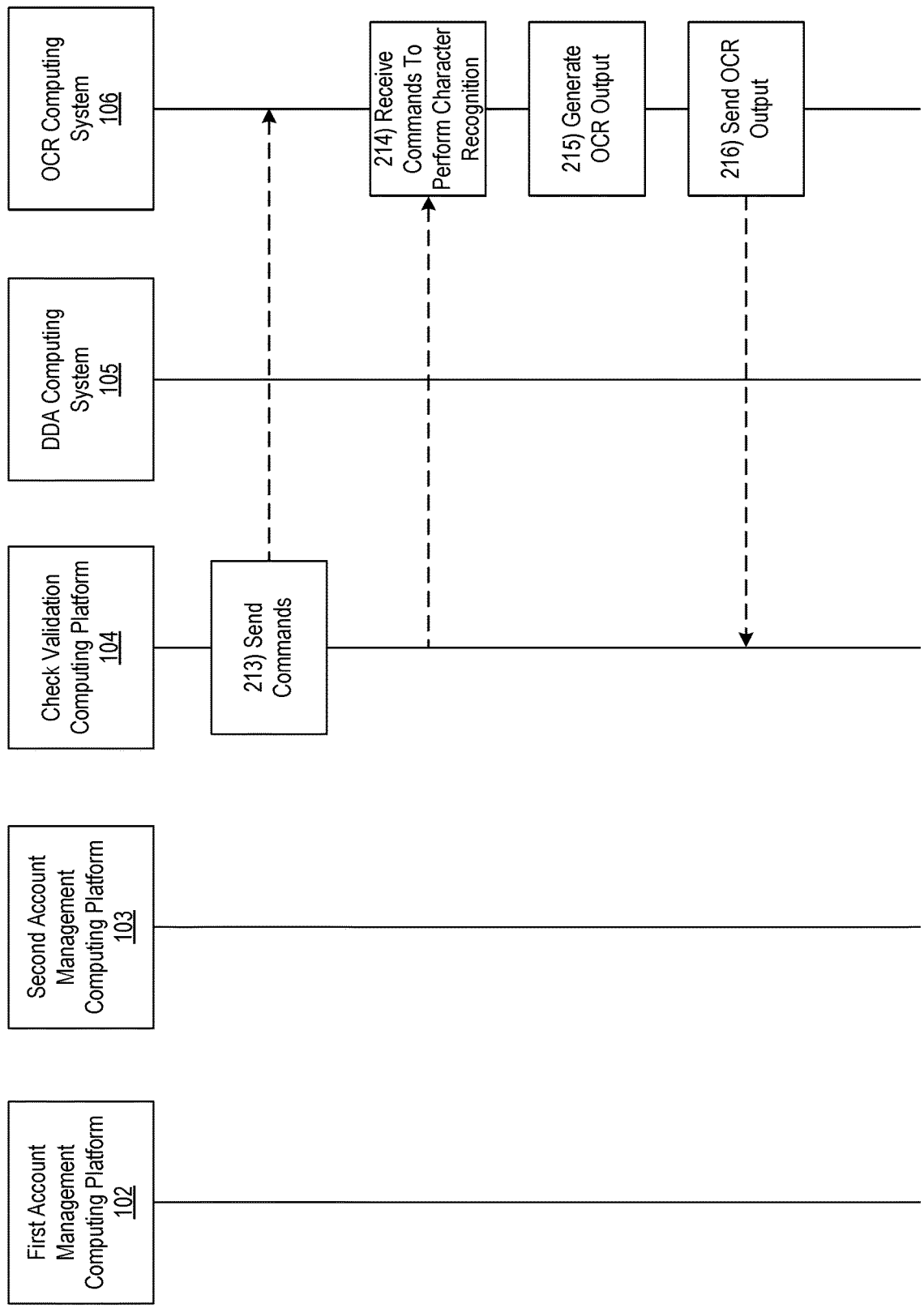

Referring to FIG. 2D, at step 213, check validation computing platform 104 may transmit the one or more OCR commands to OCR computing system 106. For example, at step 213, the check validation computing platform may establish a connection to OCR computing system 106. For example, the check validation computing platform 104 may establish a third wireless data connection to OCR computing system 106 to link the check validation computing platform 104 to the OCR computing system 106. While the third wireless data connection is established, the check validation computing platform 104 may transmit, via the communication interface 113 and to OCR computing system 106, the one or more OCR commands.

At step 214, OCR computing system 106 may receive the one or more OCR commands. For example, the OCR computing system 106 may receive, from the check validation computing platform 104, via the communication interface 113, and via the third wireless data connection, the one or more OCR commands.

At step 215, the OCR computing system 106 may generate, in response to receiving the one or more OCR commands at step 214, the OCR output. For example, the OCR computing system 106 may perform optical character recognition on the check to determine the source data associated with the check (check serial number, amount, account number, and the like). In another example, the OCR computing system 106 may determine check patterns, a check style, static check data, a plot location of particular check data, a pixel count, and a payee name associated with the check. In yet another example, the OCR computing system 106 may generate a machine learning database of checks associated with various payers, payees, and/or payer-payee combinations. In this example, the OCR computing system 106 may build a profile of various checks, and may compare, using machine learning algorithms and analysis, a check profile to other checks obtained from the machine learning database. This may allow the OCR computing system 106 to determine whether a check looks like others from a particular account.

At step 216, the OCR computing system 106 may transmit the OCR output generated at step 215 to the check validation computing platform 104. For example, the OCR computing system 106 may transmit, to the check validation computing platform 104, via the communication interface 113, and via the third wireless data connection, the OCR output.

Figure 2E:
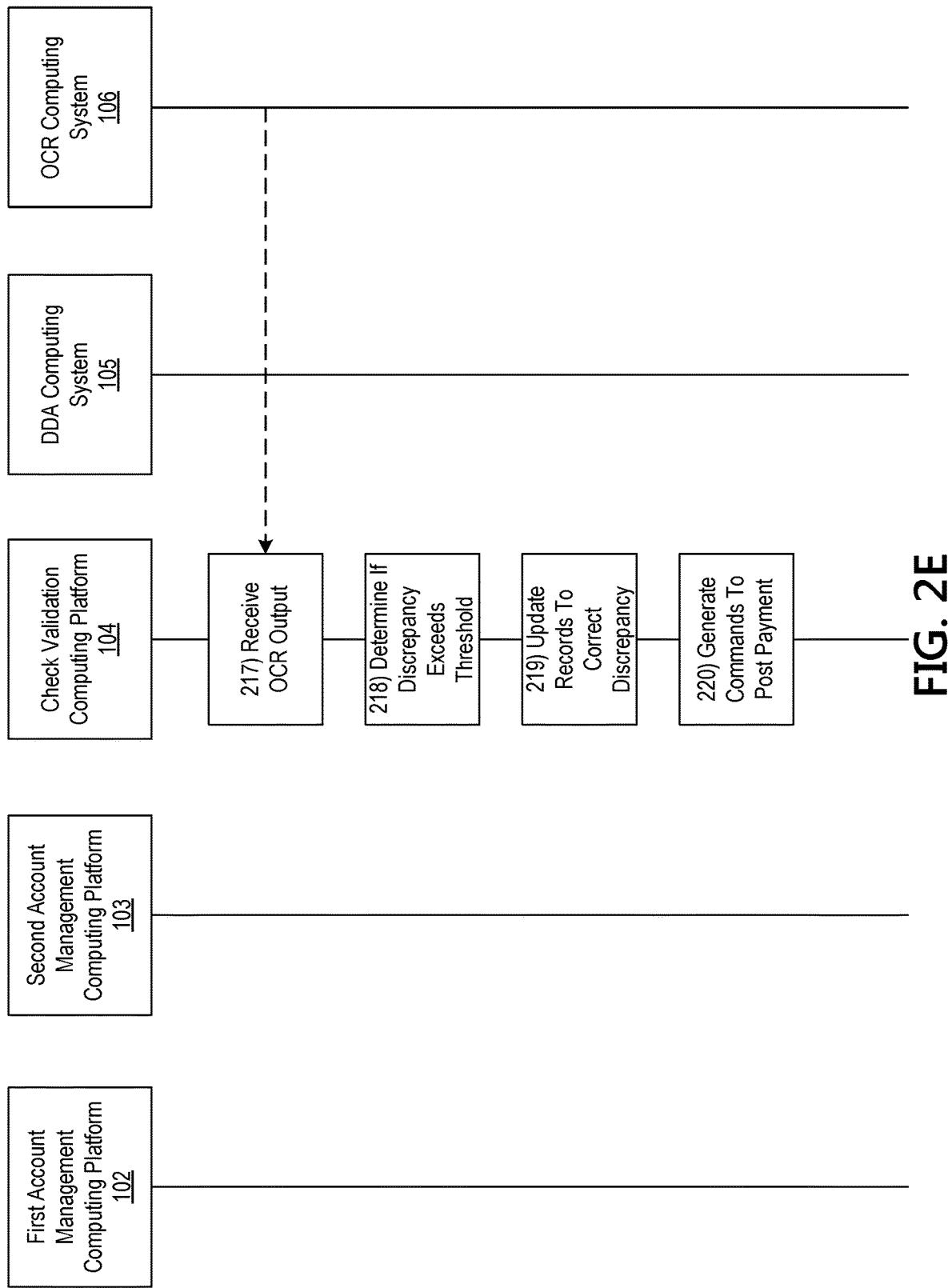

Referring to FIG. 2E, at step 217, the check validation computing platform 104 may receive the OCR output transmitted at step 216. For example, the check validation platform 104 may receive, from the OCR computing system 106, via the third wireless data connection, and via the communication interface 113, the OCR output.

At step 218, the check validation computing platform 104 may determine whether a discrepancy between the OCR output and the metadata exceeds a predetermined resolution threshold. For example, the check validation computing platform 104 may determine whether there is a discrepancy between one or more of an account number, a payment amount, and a check number indicated by the OCR output and the metadata. Alternatively or additionally, the check validation computing platform 104 may utilize machine learning algorithms and analysis to determine whether the discrepancy between the OCR output and the metadata exceeds a predetermined resolution. For example, the OCR computing system 106 may collect check sensor data from different checks associated with a plurality of payers. The OCR computing system 106 may collect the check sensor data by performing optical character recognition on a plurality of checks. For example, the OCR computing system 106 may receive instructions to determine an account number, a payment amount, a check number, check patterns, a check style, static check data, a plot location of particular check data, a pixel count, a payee name associated with the check, and the like. Based on the check sensor data, the check validation computing platform 104 may determine machine learning datasets that may link a plurality of check features to a particular payer. Then, when a new check is received, the OCR computing system 106 may perform optical character recognition on the new check to determine check sensor data associated with that new check. The check validation computing platform 104 may compare the new check sensor data to the machine learning datasets. For example, the check validation computing platform 104 may implement machine learning algorithms to determine whether the new check sensor data matches one or more machine learning datasets to a degree that exceeds a predetermined correlation threshold. For example, the check validation computing platform 104 may implement at least one of decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule based machine learning, regression, and the like. In these examples, if the check validation computing platform 104 determines that a payer name on the new check does not match a check profile associated with the new check, the check validation computing platform 104 may flag the check for further review.

For example, if the discrepancy between the OCR output and the metadata does exceed the predetermined resolution threshold, the check validation computing platform 104 may generate, based on the determination that the discrepancy between the OCR output and the metadata output exceeds the predetermined resolution threshold, a manual payment correction notification. For example, the check validation computing platform 104 may determine that the OCR output and the metadata are a match, but that the check was previously flagged by the check validation computing platform 104 due to a discrepancy between the metadata and source data from the MICR line of the check. In another example, the check validation computing platform 104 may determine, as described above, that a check profile does not match a payer name. In these examples, the check validation computing platform may determine that encoding of the check may have been tampered with or that the check may be an unauthorized reproduction. The check validation computing platform 104 may generate one or more commands directing an operator correction computing device to cause display of the manual payment correction notification. In these examples, the check validation computing platform 104 may generate the manual payment correction notification. For example, the operator correction computing device may receive manual payment correction interface information (which may, e.g., include user interface templates, user interface layouts, user interface content data, and/or other information). The operator correction computing device may cause display, in response to the one or more commands from the check validation computing platform 104, of the manual payment correction notification. In causing display of the manual payment correction user interface, the operator correction computing device may display and/or otherwise present a graphical user interface similar to graphical user interface 305, which is illustrated in FIG. 3. As seen in FIG. 3, graphical user interface 305 may include the manual payment correction notification and/or other user-selectable options and/or content. Once the manual correction has been made, the check validation computing platform 104 may receive, from the operator correction computing device, a manual payment correction confirmation. Once the manual payment correction confirmation is received, the check validation computing platform 104 may proceed to step 219.

If the discrepancy between the OCR output and the metadata does not exceed the predetermined resolution threshold, the check validation computing platform 104 may proceed to step 219 to correct the discrepancy. For example, the check validation computing platform 104 may determine that although the physical check is numbered 1234, the metadata indicates that the check is numbered 1235. In this example, the check validation computing platform 104 may determine that the discrepancy between the OCR output and the metadata does not exceed the predetermined resolution threshold. In another example, the check validation computing platform 104 may determine that the metadata indicates a $90 payment and the OCR output indicates a $100 payment. In this example, the check validation computing platform 104 may similarly determine that the discrepancy between the OCR output and the metadata does not exceed the predetermined resolution threshold, and may correct the payment to $100 prior to posting.

At step 219, the check validation computing platform 104 may update stored records to correct the discrepancy. For example, the check validation computing platform 104 may update at least one of a check number, an account number, or an amount in a stored record associated with the check.

At step 220, once the metadata has been verified or the stored records have been corrected, the check validation computing platform may generate one or more commands directing a DDA computing system to post the payment associated with the check.

Figure 2F:
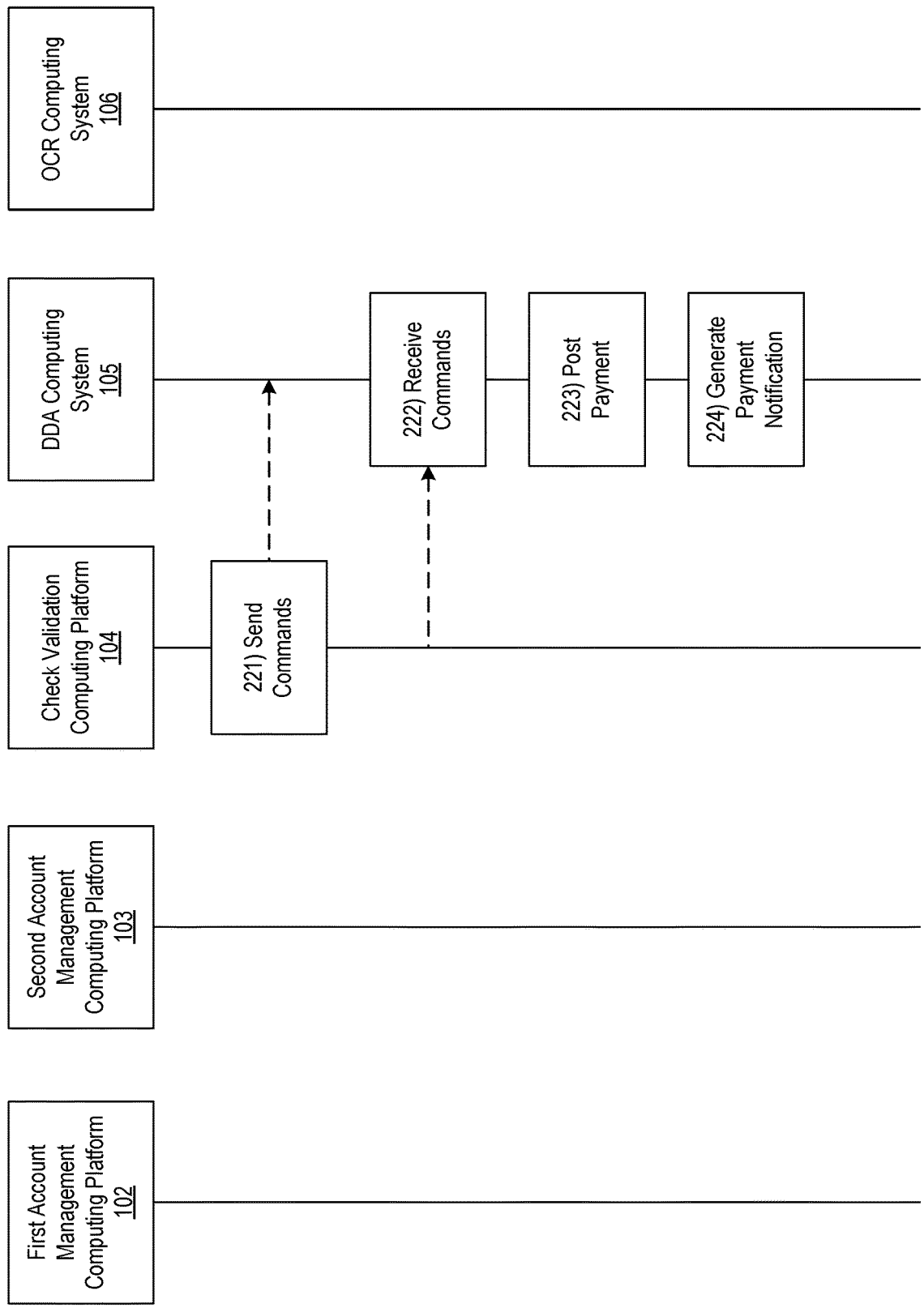

Referring to FIG. 2F, at step 221, the check validation computing platform 104 may transmit the one or more commands to post the payment to the DDA computing system 105. For example, at step 221, the check validation computing platform may establish a connection to DDA computing system 105. For example, the check validation computing platform 104 may establish a fourth wireless data connection to DDA computing system 105 to link the check validation computing platform 104 to the DDA computing system 105. While the fourth wireless data connection is established, the check validation computing platform 104 may transmit, via the communication interface 113 and to DDA computing system 105, the one or more commands to post the payment. In some examples, if the stored records associated with the check were updated, the one or more commands may comprise commands to post a correction to the payment.

At step 222, the DDA computing system 105 may receive the one or more commands to post the payment. For example, the DDA computing system 105 may receive, from the check validation computing platform 104, via the fourth wireless data connection, and via the connection interface, the one or more commands to post the payment.

At step 223, the DDA computing system 105 may post, in response to the one or more commands received at step 222, the payment. For example, the DDA computing system 105 may cause deposit of a correct amount associated with the check. The DDA computing system 105 may also cause the deposit of the check to post to a user's checking account.

At step 224, the DDA computing system 105 may generate a payment notification. For example, the payment notification may comprise an indication that a correct payment has posted, and may show the discrepancy between an original payment and the correct payment.

Referring to FIG. 2G, at step 225, DDA computing system 105 may transmit the payment notification to the check validation computing platform 104. For example, the DDA computing system 105 may transmit, to the check validation computing platform 104, via the fourth wireless data connection, and via the communication interface 113, the payment notification.

At step 226, the check validation computing platform 104 may receive the payment notification transmitted at step 225. For example, the check validation computing platform 104 may receive, from the DDA computing system, via the communication interface 113, and via the fourth wireless connection, the payment notification. For example, the check validation computing platform 104 may receive an indication that the correct payment has posted, user interface templates, user interface layouts, user interface content data, and/or other information.

At step 227, the check validation computing platform 104 may cause display of the payment notification (e.g., based on the information received from the DDA computing system 105). For example, the check validation computing platform 104 may display and/or otherwise present a graphical user interface similar to graphic user interface 405, which is illustrated in FIG. 4. As seen in FIG. 4, graphical user interface 405 may include previously determined source data associated with the check alongside revised source data associated with the check. In some instances, if a correction to the source data was not made, the graphical user interface 405 may indicate source data associated with the check without showing a revised payment. Although FIG. 4 shows an account number, a check number, and an amount associated with the check, it should be understood that other source data associated with the check may also be displayed via graphical user interface 405. For example, graphical user interface 405 may include source data such as a check style, static check data, a plot location of particular check data, a pixel count, and a payee name, a payer name, and the like.

At step 228, the check validation computing platform 104 may transmit, to the first account management computing platform 102, the payment notification received at step 226. For example, the check validation computing platform 104 may generate one or more commands directing the first account management computing platform 102 to cause display of the payment notification. The check validation computing platform 104 may transmit, to the first account management computing platform 102, the one or more commands. The check validation computing platform 104 may transmit the one or more commands to the first account management computing platform 102 via the communication interface 113, and via the first wireless data connection. The check validation computing platform 104 may transmit the one or more commands along with the payment notification. For example, the check validation computing platform may transmit, via the communication interface 113, to the first account management computing platform 102, and via the first wireless data connection, the payment notification.

Referring to FIG. 2H, at step 229, the first account management computing platform 102 may receive the payment notification transmitted at step 228. For example, the first account management computing platform 102 may receive, from the check validation computing platform 104, via the communication interface 113, and via the first wireless data connection, the payment notification.

At step 230, the first account management computing platform 102 may cause display of the payment notification. For example, the first account management computing platform 102 may cause display of the payment notification based on the one or more commands to cause display of the payment notification and the information received from the check validation computing platform 104. In some instances, in causing display of the correction notification, first account management computing platform 102 may display and/or otherwise present a graphical user interface similar to graphical user interface 405, which is illustrated in FIG. 4.

At step 231, the check validation computing platform 104 may transmit the payment notification to second account management computing platform 103. For example, the check validation computing platform 104 may generate one or more commands directing the second account management computing platform 103 to cause display of the payment notification. The check validation computing platform 104 may transmit, to the second account management computing platform 103, the one or more commands. The check validation computing platform 104 may transmit the one or more commands to the second account management computing platform 103 via the communication interface 113, and via the second wireless data connection. The check validation computing platform 104 may transmit the one or more commands along with the payment notification. Actions performed at step 231 may be similar to those described above with regard to step 228.

At step 232, the second account management computing platform 103 may receive the payment notification transmitted at step 231. For example, the second account management computing platform may receive, from the check validation computing platform 104, via the second wireless data connection, and via the communication interface 113, the payment notification. Actions performed at step 232 may be similar to those described above with regard to step 229.

Referring to FIG. 2I, at step 233, the second account management computing platform 103 may cause display of the payment notification. For example, the second account management computing platform 103 may cause display of the payment notification based on the one or more commands to cause display of the payment notification and the information received from the check validation computing platform 104. In some instances, in causing display of the payment notification, second account management computing platform 103 may display and/or otherwise present a graphical user interface similar to graphical user interface 405, which is illustrated in FIG. 4. Actions performed at step 233 may be similar to those described above with regard to step 230.

Subsequently, the example event sequence may end, and check validation computing platform 104 may continue to validate checks in a similar manner as discussed above (e.g., by comparing metadata associated with the check to source data and OCR outputs associated with the check and determining if correlations exceed predetermined thresholds) to implement check validation techniques. By operating in this way, check validation computing platform 104 may improve security and accuracy of payments prior to posting by DDA computing system 105 and/or other systems and devices included in computing environment 100. By performing OCR analysis prior to posting as payment, the check validation computing platform 104 may ensure that a payment is correct prior to posting, rather than causing an incorrect payment to post and then fixing it. The OCR analysis may also reduce the amount of manual check review to be performed if a discrepancy between various types of check data is determined.

Figure 5:
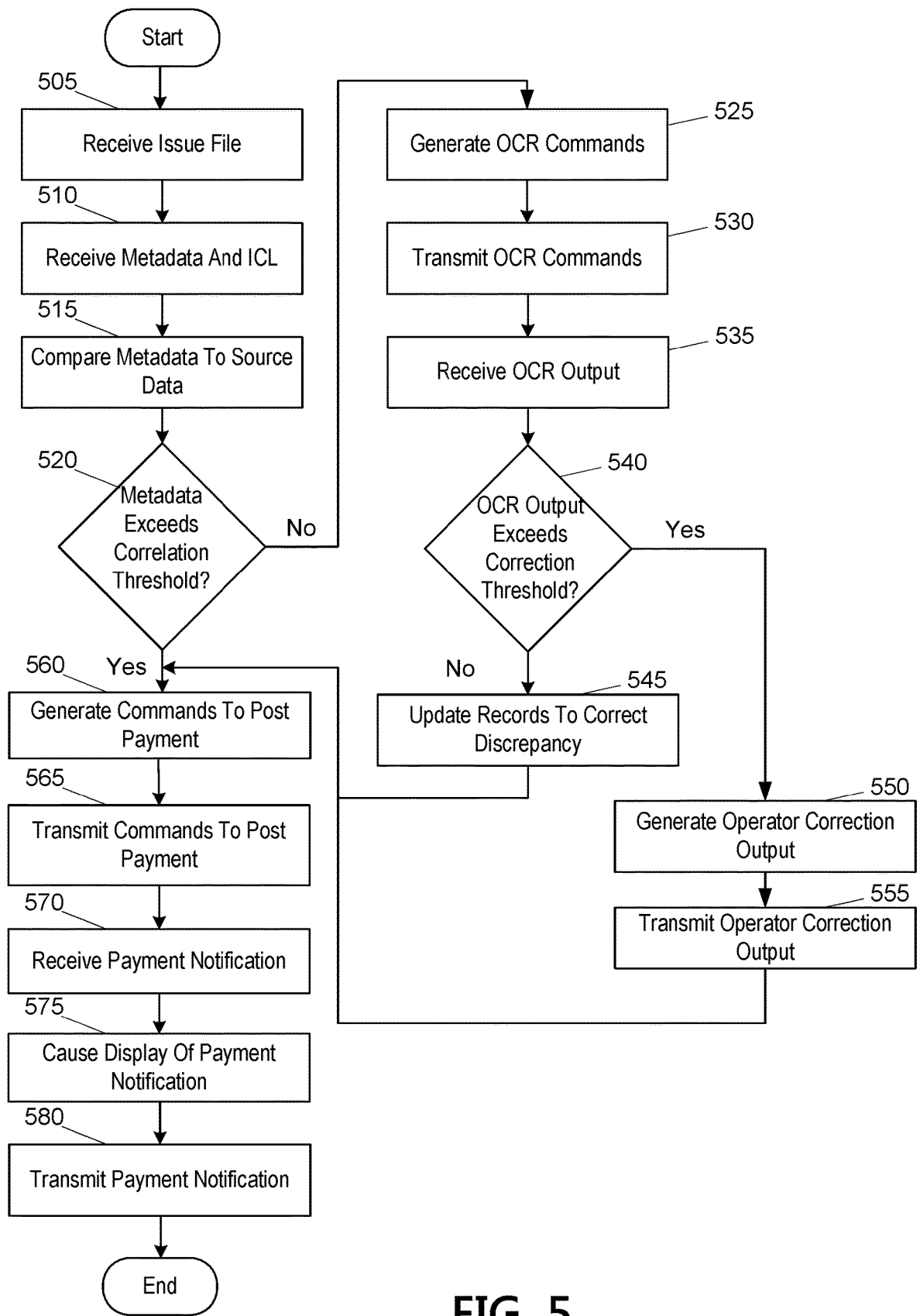
FIG. 5 depicts an illustrative method for deploying an enhanced check processing system that utilizes improved validation techniques in accordance with one or more example embodiments.

FIG. 5 depicts an illustrative method for deploying an enhanced check processing system that utilizes improved validation techniques in accordance with one or more example embodiments. Referring to FIG. 5, at step 505, a computing platform having at least one processor, a communication interface, and memory may receive, from a first account management computing platform and via a communication interface, an issue file associated with a check. At step 510, the computing platform may receive, from a second account management computing platform and via the communication interface, metadata and an ICL associated with the check. At step 515, after receiving the metadata, the computing platform may compare the metadata to source data associated with the check. In one instance, the source data may comprise the issue file. In another instance, the source data may comprise the ICL. In yet another instance, the source data may be determined from a magnetic ink character recognition (MICR) line on the check.

At step 520, the computing platform may determine whether a correlation between the source data and the metadata exceeds a predetermined correlation threshold. If the correlation does exceed the predetermined correlation threshold, the computing platform may proceed to step 560 to generate commands to post a payment associated with the check. If the correlation does not exceed the predetermined correlation threshold, the computing platform may proceed to step 525. At step 525, the computing platform may generate one or more OCR commands. At step 530, the computing platform may transmit, to an OCR computing system and via the communication interface, the one or more OCR commands. At step 535, in response to transmitting the OCR commands, the computing platform may receive, from the OCR computing system and via the communication interface, an OCR output.

At step 540, the computing platform may determine whether the OCR output exceeds a correction threshold. If the OCR output does not exceed the correction threshold, the computing platform may proceed to step 545. If the OCR output does exceed the correction threshold, the computing platform may proceed to step 550. At step 545, in response to determining that the OCR output does not exceed a correction threshold, the computing platform may update stored records associated with the check to correct an error. At step 550, the computing platform may generate an operator correction output comprising a notification to initiate manual error correction. At step 555, the computing platform may transmit, to an operator correction computing device and via the communication interface, the operator correction output. In response to the operator correction output, the computing platform may receive, from the operator correction computing device and via the communication interface, a confirmation that the error has been corrected. At step 560, the computing platform may generate one or more commands to post the payment. At step 565, the computing platform may transmit, to a DDA computing system and via the communication interface, the one or more commands. At step 570, the computing platform may receive, in response to transmitting the one or more commands, via the communication interface, and from the DDA computing system, a payment notification indicating that a payment has posted. At step 575, the computing platform may cause display of the payment notification. At step 580, the computing platform may transmit, to the account management computing platforms and via the communication interface, the payment notification. The computing platform may generate one or more commands for the account management computing platforms to cause display of the payment notification, and may send the commands along with the payment notification.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, from one or more computing platforms, source data associated with a check;
   receive, from a first account management computing platform and via the communication interface, a metadata output associated with the check;
   determine whether a correlation between the source data and the metadata output exceeds a predetermined correlation threshold;
   based on determining that the correlation between the source data and the metadata output does not exceed the predetermined correlation threshold, generate one or more commands directing an optical character recognition (OCR) computing system to perform character recognition on the check;
   transmit, to the OCR system and via the communication interface, the one or more commands directing the OCR system to perform character recognition on the check;
   receive, from the OCR system and via the communication interface, an OCR output;
   determine whether a discrepancy between the OCR output and the metadata output exceeds a predetermined resolution threshold;
   in response to determining that the discrepancy between the OCR output and the metadata output does not exceed the predetermined resolution threshold, update stored records associated with the check;
   after updating the stored records associated with the check, generate one or more commands directing a demand deposit account (DDA) computing system to post, based on a correction of the discrepancy between the OCR output and the metadata output, a corrected payment associated with the check; and
   transmit, to the DDA system and via the communication interface, the one or more commands directing the DDA system to post the corrected payment associated with the check.

2. The computing platform of claim 1, wherein the memory stores additional computer-readable instructions that, when executed by the at least one processor, further cause the computing platform to:
   receive, from the DDA system and via the communication interface, a payment notification indicating that a payment associated with the check has been posted.

3. The computing platform of claim 2, wherein the memory stores additional computer-readable instructions that, when executed by the at least one processor, further cause the computing platform to:
   transmit, to the first account management computing platform and via the communication interface, the payment notification; and
   transmit, to a second account management computing platform and via the communication interface, the payment notification.

4. The computing platform of claim 3, wherein the one or more computing platforms comprise at least one of the first account management computing platform and the second account management computing platform.

5. The computing platform of claim 4, wherein the source data comprises one or more of an issue file output from the second account management computing platform, an image cash letter (ICL) output, or a magnetic ink character recognition (MICR) output.

6. The computing platform of claim 5, wherein the memory stores additional computer-readable instructions that, when executed by the at least one processor, further cause the computing platform to:
receive, from the one or more computing systems, second source data associated with a second check;
receive, from the first account management computing platform and via the communication interface, a second metadata output associated with the second check;
determine whether a correlation between the second source data and the second metadata output exceeds the predetermined correlation threshold;
based on determining that the correlation between the second source data and the second metadata output exceeds the predetermined correlation threshold, generate one or more commands directing the DDA computing system to post a payment associated with the second check; and
transmit, to the DDA system and via the communication interface, the one or more commands directing the DDA system to post the payment associated with the second check.

7. The computing platform of claim 1, wherein the memory stores additional computer-readable instructions that, when executed by the at least one processor, further cause the computing platform to post the corrected payment associated with the check by causing deposit of an amount associated with the check.

8. The computing platform of claim 1, wherein the OCR output comprises one or more of an amount of money, an account number, a check serial number, a plot location of particular data, a pixel count, or a payee name.

9. The computing platform of claim 1, wherein the memory stores additional computer-readable instructions that, when executed by the at least one processor, further cause the computing platform to:
receive, from the one or more computing systems, second source data associated with a second check;
receive, from the first account management computing platform and via the communication interface, a second metadata output associated with the second check;
determine whether a correlation between the second source data and the second metadata output exceeds the predetermined correlation threshold;
based on determining that the correlation between the second source data and the second metadata output does not exceed the predetermined correlation threshold, generate one or more commands directing an optical character recognition (OCR) computing system to perform character recognition on the second check;
transmit, to the OCR system and via the communication interface, the one or more commands directing the OCR system to perform character recognition on the second check; and
receive, from the OCR system and via the communication interface, a second OCR output.

10. The computing platform of claim 9, wherein the memory stores additional computer-readable instructions that, when executed by the at least one processor, further cause the computing platform to:
determine whether a discrepancy between the second OCR output and the second metadata output exceeds the predetermined resolution threshold; and
based on determining that the discrepancy between the second OCR output and the second metadata output exceeds the predetermined resolution threshold, generate a manual payment correction notification;
generate one or more commands directing an operator correction computing device to cause display of the manual payment correction notification;
receive, from the operator correction computing device, a manual payment correction confirmation;
update, in response to receiving the manual payment correction confirmation, stored records associated with the second check;
after updating the stored records associated with the check, generate one or more commands directing the DDA system to post, based on a correction of the discrepancy between the second OCR output and the second metadata output, a corrected payment associated with the second check; and
transmit, to the DDA system and via the communication interface, the one or more commands directing the DDA system to post the corrected payment associated with the second check.

11. A method, comprising:
at a computing platform comprising at least one processor, a communication interface, and memory:
receiving, by the at least one processor, via the communication interface, and from one or more computing platforms, source data associated with a check;
receiving, from a first account management computing platform and via the communication interface, a metadata output associated with the check;
determining whether a correlation between the source data and the metadata output exceeds a predetermined correlation threshold;
based on determining that the correlation between the source data and the metadata output does not exceed the predetermined correlation threshold, generating one or more commands directing an optical character recognition (OCR) computing system to perform character recognition on the check;
transmitting, to the OCR system and via the communication interface, the one or more commands directing the OCR system to perform character recognition on the check;
receiving, from the OCR system and via the communication interface, an OCR output;
determining whether a discrepancy between the OCR output and the metadata output exceeds a predetermined resolution threshold;
in response to determining that the discrepancy between the OCR output and the metadata output does not exceed the predetermined resolution threshold, updating stored records associated with the check;
after updating the stored records associated with the check, generating one or more commands directing a demand deposit account (DDA) computing system to post, based on a correction of the discrepancy between the OCR output and the metadata output, a corrected payment associated with the check; and
transmitting, to the DDA system and via the communication interface, the one or more commands directing the DDA system to post the corrected payment associated with the check.

12. The method of claim 11, further comprising:
receiving, from the DDA system and via the communication interface, a payment notification indicating that a payment associated with the check has been posted.

13. The method of claim 12, further comprising:
transmitting, to the first account management computing platform and via the communication interface, the payment notification; and
transmitting, to a second account management computing platform and via the communication interface, the payment notification.

14. The method of claim 13, wherein the one or more computing platforms comprise at least one of the first account management computing platform and the second account management computing platform.

15. The method of claim 14, wherein the source data comprises one or more of an issue file output from the second account management computing platform, an image cash letter (ICL) output, or a magnetic ink character recognition (MICR) output.

16. The method of claim 15, wherein the memory stores additional computer-readable instructions that, when executed by the at least one processor, further cause the computing platform to:
receiving, from the one or more computing systems, second source data associated with a second check;
receiving, from the first account management computing platform and via the communication interface, a second metadata output associated with the second check;
determining whether a correlation between the second source data and the second metadata output exceeds the predetermined correlation threshold;
based on determining that the correlation between the second source data and the second metadata output exceeds the predetermined correlation threshold, generating one or more commands directing the DDA computing system to post a payment associated with the second check; and
transmitting, to the DDA system and via the communication interface, the one or more commands directing the DDA system to post the payment associated with the second check.

17. The method of claim 11, wherein posting the corrected payment associated with the check comprises causing deposit of an amount associated with the check.

18. The method of claim 11, wherein the OCR output comprises one or more of an amount of money, an account number, a check serial number, a plot location of particular data, a pixel count, or a payee name.

19. The method of claim 11, wherein the memory stores additional computer-readable instructions that, when executed by the at least one processor, further cause the computing platform to:
determining that a discrepancy between a second OCR output and a second metadata output exceeds the predetermined resolution threshold, wherein the second OCR output and the second metadata output are associated with a second check;
based on determining that the discrepancy between the second OCR output and the second metadata output exceeds the predetermined resolution threshold, generating a manual payment correction notification;
generating one or more commands directing an operator correction computing device to cause display of the manual payment correction notification;
receiving, from the operator correction computing device, a manual payment correction confirmation;
updating, in response to receiving the manual payment correction confirmation, stored records associated with the second check;
after updating the stored records associated with the check, generating one or more commands directing the DDA system to post, based on a correction of the discrepancy between the second OCR output and the second metadata output, a corrected payment associated with the second check; and
transmitting, to the DDA system and via the communication interface, the one or more commands directing the DDA system to post the corrected payment associated with the second check.

20. One or more non-transitory computer-readable media storing instructions that, when executed by a computing platform comprising at least one processor, a communication interface, and memory, cause the computing platform to:
receive, from one or more computing systems, source data associated with a check;
receive, from a first account management computing platform and via the communication interface, a metadata output associated with the check;
determine whether a correlation between the source data and the metadata output exceeds a predetermined correlation threshold;
based on determining that the correlation between the source data and the metadata output does not exceed the predetermined correlation threshold, generate one or more commands directing an optical character recognition (OCR) computing system to perform character recognition on the check;
transmit, to the OCR system and via the communication interface, the one or more commands directing the OCR system to perform character recognition on the check;
receive, from the OCR system and via the communication interface, an OCR output;
determine whether a discrepancy between the OCR output and the metadata output exceeds a predetermined resolution threshold;
in response to determining that the discrepancy between the OCR output and the metadata output does not exceed the predetermined resolution threshold, update stored records associated with the check;
after updating the stored records associated with the check, generate one or more commands directing a demand deposit account (DDA) computing system to post, based on a correction of the discrepancy between the OCR output and the metadata output, a corrected payment associated with the check; and
transmit, to the DDA system and via the communication interface, the one or more commands directing the DDA system to post the corrected payment associated with the check.

* * * * *